United States Patent
Breedijk

(10) Patent No.: US 6,466,878 B1
(45) Date of Patent: Oct. 15, 2002

(54) METHOD FOR SELECTING A TIRE SET FROM A GROUP OF EXPERIMENTAL TIRES

(75) Inventor: Frans Nico Breedijk, Hansdorf (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/319,672

(22) PCT Filed: Dec. 27, 1996

(86) PCT No.: PCT/US96/20404

§ 371 (c)(1),
(2), (4) Date: Jun. 7, 1999

(87) PCT Pub. No.: WO98/29724

PCT Pub. Date: Jul. 9, 1998

(51) Int. Cl.[7] .................................................. G01L 5/20
(52) U.S. Cl. .......................................... 702/41; 73/146
(58) Field of Search .............................. 702/41; 73/146; 700/279

(56) References Cited

U.S. PATENT DOCUMENTS

| 4,095,374 A | * | 6/1978 | Ugo ............................... 451/1 |
| 4,434,652 A | | 3/1984 | Christie ....................... 73/146 |
| 4,475,384 A | | 10/1984 | Christie ....................... 73/146 |
| 4,773,011 A | | 9/1988 | VanHoose ............... 364/424.03 |
| 5,229,954 A | * | 7/1993 | Beebe .......................... 700/280 |
| 5,321,628 A | * | 6/1994 | Beebe .......................... 700/279 |
| 5,365,781 A | | 11/1994 | Rhyne .......................... 73/146 |

FOREIGN PATENT DOCUMENTS

| EP | 0091393 | 10/1983 |
| JP | 01-314935 | 12/1989 |
| JP | 03-3239607 | 10/1991 |
| WO | WO92/01918 | 2/1992 |
| WO | WO92/19948 | 11/1992 |
| WO | WO93/07460 | 4/1993 |

* cited by examiner

Primary Examiner—John S. Hilten
Assistant Examiner—Jacquelyn M. Myster
(74) Attorney, Agent, or Firm—Howard M. Cohn

(57) ABSTRACT

A method for selecting one or more sets of experimental tires of one construction based on the residual forces on each axle and the position that each individual tire is mounted to a vehicle. The method selects sets of tires where predefined limits relating to the residual forces on the front and rear axles are met. The advantage of this method is the ability to select matched sets of tires from a larger group of experimentally built tires so that the performance of the matched set(s) will behave as randomly chosen sets from uniform production runs.

10 Claims, 2 Drawing Sheets

Figure 1:
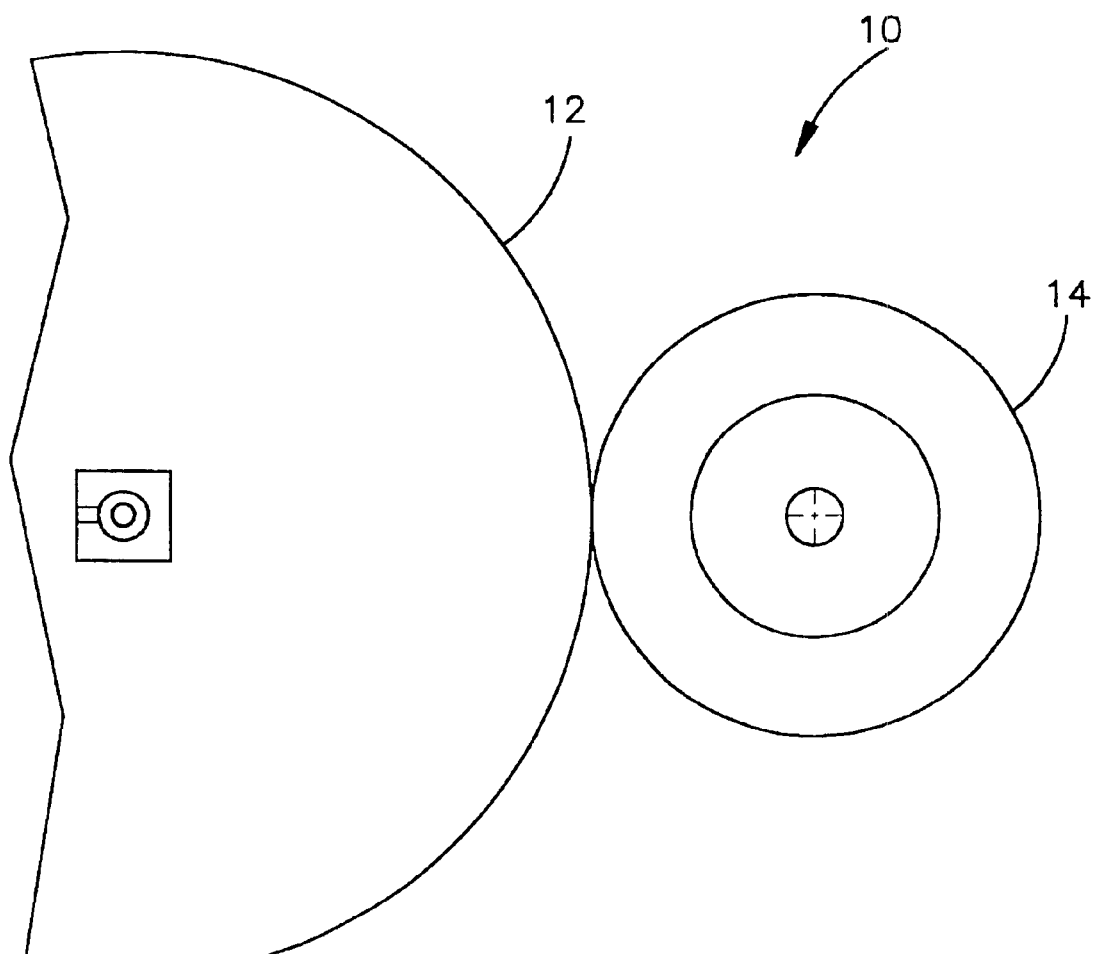

```
┌─────────────────────────────────────────────────────────────────────┐
│ MEASURE THE PLYSTEER AND CONICITY OF EACH TIRE OF A GROUP           │
│ OF EXPERIMENTAL TIRES IN THE CW AND CCW DIRECTIONS WITH A TIRE      │
│ UNIFORMITY MACHINE FOR A SECOND TIRE DEFLECTION CORRESPONDING       │
│ TO A HIGH LOAD, AND FOR A FIRST TIRE DEFLECTION CORRESPONDING       │
│                    TO A NORMAL LOAD.                                │
└─────────────────────────────────────────────────────────────────────┘
                                  │
                                  ▼
┌─────────────────────────────────────────────────────────────────────┐
│ CALCULATE THE AVERAGE LATERAL FORCE FOR EACH TIRE AT BOTH THE       │
│   NORMAL LOAD AND THE HIGH LOAD WITH RESPECT TO THE DOT SIDE        │
│       OF TIRE BASED ON THE MEASURED VALUES FOR PLYSTEER AND         │
│            CONICITY IN BOTH THE CW AND CCW DIRECTIONS.              │
└─────────────────────────────────────────────────────────────────────┘
                                  │
                                  ▼
┌─────────────────────────────────────────────────────────────────────┐
│ APPLY THE RULE OF AXLE STABILTY BY DETERMINING THE STABILITY OF     │
│ THE FRONT AND REAR AXLE WITH RESPECT TO EACH OTHER BASED ON         │
│ THE RESF AND THE RESR DETERMINED FROM THE CALCULATED LATERAL        │
│   FORCE MEASUREMENTS OF THE PAIRS OF SELECTED TIRES TAKEN AT        │
│ THE NORMAL LOAD AND SELECTING GROUPINGS OF PAIRS OF TIRES FOR       │
│   MOUNTING TO THE FRONT AND REAR AXLES SO THAT THE RESR ON          │
│    THE REAR AXLE IS EQUAL TO OR A PREDETRMINED AMOUNT GREATER       │
│                    THAN THE RESF ON THE FRONT AXLE.                 │
└─────────────────────────────────────────────────────────────────────┘
                                  │
                                  ▼
┌─────────────────────────────────────────────────────────────────────┐
│    APPLY THE RULE OF LOAD SENSITIVITY BY DETERMINING THE LOAD       │
│    SENSITIVITY USING THE RESIDUAL FORCES FOR THE FRONT AND REAR     │
│     AXLES BASED ON THE RESF AND THE RESR DETERMINED FROM THE        │
│ CALCULATED LATERAL FORCE MEASUREMENTS OF THE PAIRS OF SELECTED      │
│ TIRES AND SELECTING GROUPINGS OF PAIRS OF TIRES TAKE AT THE HIGH    │
│  LOAD FOR MOUNTING TO THE FRONT AND REAR AXLES SO THAT a) THE       │
│   ABSOLUTE VALUE OF THE RESIDUAL FORCE ON THE RESR AXLE AT THE      │
│   HIGH LOAD IS EQUAL TO OR A PREDETERMINED AMOUNT GREATER THAN      │
│   THE ABSOLUTE VALUE OF THE RESIDUAL FORCE ON THE FRONT AXLE AT     │
│    THE HIGH LOAD; AND b) THE ABSOLUTE VALUE OF THE RESIDUAL FORCE   │
│   ON THE FRONT AXLE AT THE HIGH LOAD IS EQUAL TO OR GREATER THAN    │
│      THE ABSOLUTE VALUE OF THE RESIDUAL FORCE ON THE FRONT AXLE     │
│                           AT THE NORMAL LOAD.                       │
└─────────────────────────────────────────────────────────────────────┘
                                  │
                                  ▼
┌─────────────────────────────────────────────────────────────────────┐
│   APPLY THE RULE OF AXLE PRELOAD BY DETERMINIG THE PRELOAD ON       │
│    THE FRONT AND REAR AXLES BASED ON THE RESF AND THE RESR          │
│     DETERMINED FROM THE CALCULATED LATERAL FORCE MEASUREMENTS       │
│     FOR PAIRS OF SELECTED TIRES TAKEN AT THE NORMAL LOAD AND        │
│ SELECTING GROUPINGS OF PAIRS OF TIRES FOR MOUNTING TO THE FRONT     │
│      AND REAR AXLES SO THAT THE RESF AND THE RESR BOTH AT THE       │
│     NORMAL LOAD ARE GREATER THAN A PREDETERMINED MAXIMUM VALUE      │
│              AND LESS THAN A PREDETERMINED MINIMUM VALUE.           │
└─────────────────────────────────────────────────────────────────────┘
                                  │
                                  ▼
┌─────────────────────────────────────────────────────────────────────┐
│ SELECT A SET OF FOUR TIRES FOR FRONT AND REAR AXLES WHICH MEET      │
│ THE RULE OF AXLE STABILITY, RULE OF LOAD SENSITIVITY, AND THE RULE  │
│                        OF AXLE PRELOAD.                             │
└─────────────────────────────────────────────────────────────────────┘
```

Fig.2

METHOD FOR SELECTING A TIRE SET FROM A GROUP OF EXPERIMENTAL TIRES

TECHNICAL FIELD

This invention relates to the field of selecting one or more sets of experimental tires of one construction. More particularly, the present invention relates to a method for selecting one or more sets of tires from a larger group of experimentally built tires so that the performance of the matched set(s) will behave as randomly chosen sets from uniform production runs.

BACKGROUND ART

According to the prior art, during the development of a new tire construction for a specific car, a number of different tire experimental constructions are typically produced. Each of these constructions has different variations of the same construction parameters. Typically about five to forty tires are produced for each of the experimental tire constructions. Then, these tires are subjected to a number of tests in the laboratory to measure various operating parameters such as for example lateral and radial force variation, weight, and visual appearance. From each of the different constructions of experimental tires, a set of four, ideally closely matched tires are selected for evaluation purposes. The tires, which are to be representative of each of the different constructions of experimental tires, are typically selected by tire serial numbers in the order of construction. Among the constructed tires, some tires do not always meet original equipment (OE) limits on specifications, such as for example, force variation, weight or visual defects. The result of selecting tires based on preset specifications is a set of four tires for each construction with serial numbers, such as for example, 2,3,4,6 or 8,9,10,11, assigned to each of the tires in each experimental group of tires. These sets of tires for each construction are then road tested by expert drivers to assess their performance based on subjective criteria. Using various criteria, including the laboratory results and the subjective handling characteristics, the suitability of each construction is evaluated as to whether it meets the desired operating performance. Due to the variations inherent in each of the experimental tires, there is always a possibility that one set of four experimental tires will produce enhanced handling characteristics while a different set of the same construction of experimental tires will have poorer handling characteristics. Therefore, this method of selection has been found to sometimes result in sets of tires of the same experimental construction which give erratic results as compared to other sets of tires of the same experimental construction. The latter method can be particularly erratic where only on,set per experimental construction is tested because the non-repeatability of the sets is hidden. Another deficiency in this method of tire selection is that rebuilds or production models of apparently good constructions are frequently unable to repeat the results of the selected group.

SUMMARY OF THE INVENTION

It is an object of the present invention to provide a method of testing experimental tire sets of one construction to obviate the problems and limitations of the prior art methods.

It is another object of the present invention to increase the repeatability of performance of a set of experimental tires of one construction by selecting a specific combination of tires to form a set of four tires from a larger group of experimental tires for a vehicle.

Another object of the invention is to select a set of experimental tires of one construction based on criteria including plysteer, conicity, load sensitivity, residual forces on each axle and the position each individual tire is mounted on the rim, and to the vehicle.

Still another object of the invention is to select a set of experimental tires of one construction with a tire prediction software program based on criteria including plysteer, conicity, load sensitivity, residual forces on each axle and the position each individual tire is mounted on the rim, and to the vehicle.

Accordingly, there is provided a method for selecting a set of tires from a group of experimental tires. The method comprising the steps of: a) determining the average lateral force for each tire of a group of experimental tires for both a first tire deflection and for a second tire deflection; b) determining the stability of the front and rear axles with respect to each other and selecting groupings of pairs of tires for mounting to the front and rear axles so that the residual force on the rear axle (RESR) at the first tire deflection is equal to or a predetermined amount greater than the residual force on the front axle (RESF) at the first tire deflection; c) determining the load sensitivity using the RESF and the RESR, both at the second tire deflection, and selecting groupings of pairs of tires the second tire deflection for mounting to the front and rear axles so that the absolute value of the RESR at the second tire deflection is equal to or a predetermined amount greater than the absolute value of the RESF at the second tire deflection and that the absolute value of the RESF at the second tire deflection is equal or greater than the absolute value of the RESF at the first tire deflection; d) determining the preload on the front and rear axles based on the RESF and the RESR, both at the first tire deflection, and selecting groupings of pairs of tires for mounting to the front and rear axles so that the RESF and RESR, both at the first tire deflection, are greater than a predetermined maximum value or less than a predetermined minimum value; and e) selecting a set of four tires for front and rear axles which meet the criteria set forth in steps b, c, and d.

IN THE DRAWINGS

The structure, operation, and advantages of the presently preferred embodiments of the invention will become further apparent upon consideration of the following description taken in conjunction with the accompanying drawings.

FIG. 1 is a schematic illustration of a force variation machine for testing tires in accordance with the present invention; and FIG. 2 is a flow chart of a method for selecting a tire set from a group of experimental tires, in accordance with the invention.

DETAILED DESCRIPTION OF THE INVENTION

The invention is directed to a method for selecting a set of four tires from a large group of experimentally built tires of a certain construction so that the performance of the selected set more closely predicts the performance of a comparable set of production tires of the same construction. Typically, the selection process is carried out with a tire handling prediction software program run on a conventional computer, such as a PC. To better understand the principles behind the present invention, a brief discussion follows of several tire construction variables which can be measured in a laboratory and inputted into the tire handling prediction software program whereby the performance of the tire can be analyzed and compared with other tires.

One important parameter in the selection process is the total lateral force exerted by the tire, at the interface between the tire and the surface against which it is rolling, in the direction perpendicular to the direction of rolling. This force is measured by rotating the tire against a large load wheel 12 of a tire uniformity machine 10, as shown in FIG. 1. The lateral force measurement is taken from the load wheel 12 which is moved in the lateral direction by the force of the tire. The lateral force also varies depending on which direction the tire is rolling with respect to the load wheel. The lateral force measurement typically varies about the wheel and is dependent upon the position of the tire during the time of the measurement. The lateral force causes the tire, when mounted on an automobile, to either pull to the right when the lateral force has a positive value or to pull to the left when the lateral force has a negative value. Therefore, each lateral force measurement is commonly given with respect to the Department of Transportation (DOT) number located on a sidewall of the tire. Further, the mounting of the measured tire on a rim and its location on an axle must always be done with the DOT number in a specified location.

The variation in lateral force includes two force components, the plysteer and the conicity. The plysteer is dependent upon the angle that the steel belts are placed with respect to the tire centerline. Plysteer is defined as the symmetrical part of the lateral force measurement with the measured values being equally positive and negative dependent whether the tire is rotated in the clockwise (CW) or counter-clockwise (CCW) direction. The plysteer is calculated by the following equation.

$$\text{Plysteer} = (LF1 + LF2)/2$$

where $LF1$ is the lateral force in one direction, i.e. CW $LF2$ is the lateral force in a second direction, i.e. CCW The conicity is dependent upon the symmetry of the tire construction. The conicity is typically not symmetrical about the tire. The conicity is the primary factor which causes the tire to pull in one direction or the other. The conicity is calculated by the following equation.

$$\text{Conicity} = (LF1 + LF2)/2$$

where $LF1$ is the lateral force in one direction, i.e. CW $LF2$ is the lateral force in a second direction, i.e. CCW Typically, the tires are measured, one at a time, on a conventional Tire Uniformity Machine (TUM) 10, such as a Model No. D70LTW available from the Akron Standard Co. of Akron Ohio. The tires are tested with first and second tire deflections also called the normal load and the higher load, respectively, herein. The tire deflections can be controlled by variations in the inflation pressure of the tire in combination with variations in the load applied to the tire by the load wheel of the TUM. The first test deflection represents about 80% to about 120% of the normal deflection, preferably about 90% to about 110% of the normal deflection, and most preferably about 100% of the normal deflection. The second test deflection represents about 130% to about 170% of the normal deflection, preferably about 140% to about 160% of the normal deflection, and most preferably about 150% of the normal deflection. For the purpose of describing the present invention, the inflation pressure of the tires is kept constant and the loading of the tires are a result of the pressing of the load wheel 12 of TUM 10 against the tire.

To begin the method of the present invention, the tire is initially tested at the second deflection and loaded to a high load, i.e., about 150% of the normal load, by pressing load wheel 12 against the tire. After the tire is warmed up on TUM 10, it is rotated in a first direction, e.g., the clockwise (CW) direction, and the values of the conicity and the plysteer of the tire are measured and outputted by the TUM. Then, the tire is again warmed up on TUM 10, it is rotated in a second opposite direction, e.g., counter-clockwise (CCW) direction, while the conicity and the plysteer of the tire is again measured and outputted by the TUM. Using the equations set forth above, the value of the average lateral force for the higher load is calculated based on the measured values for the plysteer and conicity. The calculations can be incorporated in a computer program, such as a tire handling prediction program generally described herein. Then the procedure is repeated at the first deflection when the tire is loaded to 100% load, called the normal load herein. The value of the average lateral force for the normal loading is again calculated based on the measured values for the plysteer and conicity output by the TUM. Based on these measurements and calculations, values for the plysteer, conicity, and lateral force variation of each tire with respect to the DOT number and for the normal and high loadings are known.

Handling is a general term that describes how vehicles negotiate maneuvers, usually starting with a change of direction. The driver judges the reaction of the car to his steering input, and decides within milliseconds if his input gives the expected response. If not, he will do a correction. There are many speculations about what factors influence the driver's perception of the reaction of the car to his steering input. These factors include the driver's visual perception of the displacement of the vehicle and his visual perception and sense of the lateral speed change. Both of these effects are not really discernable after only milliseconds and the driver's perception of the handling characteristics is an educated but subjective evaluation.

Several other significant factors relating to tires, which effect the handling of an automobile and by which the performance of the tires is judged, are now set forth. One factor for stable operation of a car is that the stability of the rear axle should be higher than that of the front axle. While car geometry normally ensures this relationship, the tires should be selected so that they don't interfere with this relationship. Because of this factor, a first rule, the Rule of Axle Stability, is postulated that if the residual forces at the normal load on the front and rear axles have identical signs and the RESR is higher or equal to the RESF, the pair of tires selected for mounting to the front and rear axles meets the requirements of first Rule. Ideally the plysteer values of all tires are identical and therefore the loading on the axle from the pair of tires mounted to either end is equal to the sum of the conicities. The loading from the conicities results in a residual force on the axle, RESF on the front axle and RESR for the rear axle, that tends to either compress or pull apart the axle. Note that the determination of the residual forces is taken with values resulting from the standard or normal load. Typically, the Rule of Axle Stability requires that the residual forces on the rear axle are about 0 through 4.0 pounds and preferably about 0 through 2.0 pounds greater than the residual forces on the front axle. The axle preload, known as the residual force on the axle, is determined by the following equation.

> Residual Force=(sum of conicity of the pair of tires mounted to axle+difference of the plysteer of the pair of tires mounted to axle)/2.

Note that, for the Rule of Axle Stability, the residual force is determined from the conicity and plysteer calculated from the lateral force measurements at the normal loading of the tire.

Another known factor in selecting a set of four tires from a larger group of experimental tires is load sensitivity. When a car driving on a road hits a bump with the left front tire, the front axle gets, for instance, a push to the right because of an increase in the plysteer and/or conicity.

Then when the left rear tire hits the same bump, the rear axle should react in the same manner, i.e., move to the right. If the rear axle does not react in the same manner, the driver would get an unsteady feeling from the car performance. Accordingly, a second rule, the Rule for Load Sensitivity, is introduced that the load sensitivity of the front and rear axle should be in the same direction, i.e. the residual forces on the front axle go up when the residual forces on the rear axle go up, and vice versa. To calculate the load sensitivity, the residual forces for the front and rear axles are determined as discussed above, but with the calculations of average lateral force taken at the high load, i.e. 150% of the normal load. Generally, the Rule for Load Sensitivity requires: a) that the absolute value of the residual force at the high load on the rear axle is greater or equal to the absolute value of the residual force at the high load on the front axle; and b) that the absolute value of the residual forces on the front axle at the high load is equal or greater than the absolute value of the residual forces on the front axle at the normal load. In practice, the Rule for Load Sensitivity requires that the difference between the residual forces on the front and rear axle are within a range of values of about +/-4.0 pounds and preferably about +/-2.0 pounds of each other. While this range of values is preferred, it is also within the terms of the invention to change the load sensitivity depending on the number of experimental tires from which the one or more sets of tires are to be selected.

While four tires mounted in pairs to the axles of an automobile typically work together, changes to the tire pressure of one tire, for instance, influences the handling behavior of the other tires. For example, a bad handling set of tires can sometimes be improved by adjusting the tire pressure either up or down at any one of the four wheel positions. One possible reason for this effect is because each axle of the car adjusts itself to a zero plysteer, necessary to drive straight ahead. The residual forces on each axle created by the asymmetries and inequalities of the pair tires mounted to each can be calculated. These residual forces are beneficial in that they preload the tires so that they can transmit forces directly upon demand. On the other hand, these residual forces can be detrimental if the ratio of the residual forces between the front and rear axles is not in the correct relation, or when these forces cancel the preloads generated by the car geometry.

For a tire to be able to react to steering within milliseconds, the tire must be positioned on the rim where it is preloaded. It is believed that, If the tire is in an unstable position, i.e., where the tire preload created by the car geometry is canceled by the tire asymmetry, the initial turning input by the driver causes the tire to first go to a preloaded condition before generating the lateral force necessary to negotiate the handling maneuver. The time required for the tire to go to the preloaded condition is in the order of several milliseconds. Predicting the above mentioned effect from any data is very difficult. Personal observations have indicated that a set of tires without preload drives unsteady and needs constant corrections. Starting from this basic understanding, a prediction of when a tire being driven in a straight ahead direction looses preload is not presently possible. Therefore, a third rule relating to axle preload is that the resulting force at normal load on each axle should be out of a predefined range of values has been postulated for selecting a set of good handling tires. For example, the Rule for Axle Preload is that the selected tires are OK if the residual forces at the normal load on both the front axle (RESF) and the rear axle (RESR) are greater than a predetermined maximum value or less than a predetermined minimum value. The maximum and minimum values of the RESF and RESR at normal load depend on the individual automobile on which the tire constructions are being tested. For example, the maximum value at the normal load can be between 3.0 and 5.0 lbs and the minimum value at the normal load can be between -3.0 lbs and -5.0 lbs.

To apply the three rules mentioned above, the calculations are typically accomplished with the software prediction program into which the measurements of the force variation machine at the normal and higher loads have been entered. Referring to FIG. 2, there is illustrated a flow chart of the steps required to select a set of four closely matched tires from a larger group of experimentally built tires so that the operation of the experimental set of tires more closely matches the variations in the construction of production tires. The steps of selecting include the following:

1. Measure the plysteer and conicity of each tire of a group of experimental tires in the CW and CCW directions with a tire uniformity machine for a second tire deflection corresponding to a high load. Then, measure the plysteer and conicity of each tire in the CW and CCW directions for a first tire deflection corresponding to a normal load.
2. Calculate the average lateral force for each tire at both the normal load and the high load with respect to the DOT side of tire based on the measured values for plysteer and conicity in both the CW and CCW directions.
3. Apply the Rule of Axle Stability by determining the stability of the front and rear axles with respect to each other based on the RESF and the RESR determined from the calculated lateral force measurements of the pairs of selected tires taken at the normal load and selecting groupings of pairs of tires for mounting to the front and rear axles so that the RESR on the rear axle is equal to or a predetermined amount greater than the RESF on the front axle.
4. Apply the Rule of Load Sensitivity by determining the load sensitivity using the residual forces for the front and rear axles based on the RESF and the RESR determined from the calculated lateral force measurements of the pairs of selected tires and selecting groupings of pairs of tires taken at the high load for mounting to the front and rear axles so that the absolute value of the residual force on the rear axle is equal to or a predetermined amount greater than the absolute value of residual force on the front axle and that the absolute value of the residual forces on the front axle at the high load is equal or greater than the absolute value of the residual forces on the front axle at the normal load.
5. Apply the Rule of Axle Preload by determining the preload on the front and rear axles based on the RESF and the RESR determined from the calculated lateral force measurements for pairs of selected tires taken at the normal load and selecting groupings of pairs of tires for mounting to the front and rear axles so that the residual forces at the normal load on both the front axle (RESF) and the rear axle (RESR) are greater than a predetermined maximum value or less than a predetermined minimum value.

6. Select a set of four tires for front and rear axles which meet the Rules set forth in steps 3, 4, and 5.

After the conicity and plysteer data have been measured at the normal and higher loads and the lateral force variation for each tire has been calculated, the set of tires and their positions on the axles of an automobile are selected typically with the prediction computer program so that the three rules are met. There are 24 possibilities combinations of mounting four tires on the left front (LF), right front (RF), left rear (LR) and right rear (RR) of a car. This assumes that the tires are not turned around on the rim. The following illustration is the mounting positions for six different sets of four tires having serial numbers 1, 2, 3 and 4.

| Set | LF | RF | LR | RR |
|-----|----|----|----|-----|
| 1 | 1 | 2 | 3 | 4 |
| 2 | 1 | 2 | 4 | 3 |
| 3 | 1 | 3 | 2 | 4 |
| 4 | 1 | 3 | 4 | 2 |
| 5 | 1 | 4 | 2 | 3 |
| 6 | 1 | 4 | 3 | 2 |

Repeat the same with tire 2, 3 and 4 on the LF position.

Now for each permutation, the above mentioned three rules can be applied and tested to determination whether or not the combination fulfills each criteria, i.e. the Rule of Axle Stability, the Rule of Load Sensitivity, and Rule of Preload. Then, one or more tire sets which meet all of the three rules can be tested, to see if the prediction holds.

A typical example of a table which could be generated by a computer program and displayed on a computer screen is shown below in Chart I.

CHART I

| Construction Type | AE5593-00 | | | | | | | |
|---|---|---|---|---|---|---|---|---|
| Serial Nos. | 1 | 2 | 3 | 4 | | | | |
| Conicity | 18 | 7 | 18 | 24 | Test Load 150% | | | |
| Plysteer | 88 | 89 | 86 | 85 | | | | |
| Conicity | 7 | 3 | 5 | 8 | Test Load 100% | | | |
| Plysteer | 70 | 71 | 69 | 67 | | | | |
| PERMU-TATIONS | | | | | | | | |
| Tire Set | 1 | 2 | 3 | 4 | 5 | 6 | 7 | 8 |
| Left Front | 1 | 1 | 1 | 1 | 1 | 1 | 2 | 2 |
| Right Front | 2 | 2 | 3 | 3 | 4 | 4 | 1 | 1 |
| Left Rear | 3 | 4 | 2 | 4 | 2 | 3 | 3 | 4 |
| Right Rear | 4 | 3 | 4 | 2 | 3 | 2 | 4 | 3 |
| RESIDUAL FORCE (RES) PER FRONT (F) AND REAR(R) AXLE IN POUNDS | | | | | | | | |
| Test Load 100% | | | | | | | | |
| RESF | 4.5 | 4.5 | 6.5 | 6.5 | 9 | 9 | 5.5 | 5.5 |
| RESR | 7.5 | 5.5 | 7.5 | 3.5 | 5 | 3 | 7.5 | 5.5 |
| Test Load 150% | | | | | | | | |
| RESF | 12 | 12 | 19 | 19 | 23 | 23 | 13 | 13 |
| RESR | 22 | 21 | 18 | 14 | 14 | 11 | 22 | 21 |
| RULES | | | | | | | | |
| Preload | OK | OK | OK | OK | OK | OK | OK | OK |
| Stability | OK | OK | OK | NOK | NOK | NOK | OK | OK |
| Load Sensitivity | OK | OK | NOK | NOK | NOK | NOK | OK | OK |
| Total | OK | OK | NOK | NOK | NOK | NOK | OK | OK |

The typical rules as applied for this example
Preload: Not OK (NOK) if the RESF or RESR at 100% load are between +3 lbs. and −3 lbs.
Stability: OK if RESR 100% >= RESF 100%
Load Sensitivity: OK if RESR 150% >= RESF 150% and RESF 150% >= RESF 100%

Below are a number of tests examples which illustrate the use of the methodology of the present invention to predict sets of tires and their locations on a vehicle to provide enhanced performance.

TEST EXAMPLES

Example 1

An example of a selection process based on a construction with only 4 tires follows. The lateral force variation data from the TUM is listed below for two loads, i.e. 100% and 150%, exerted by the load wheel on the tire. The serials represent a serial number on each tire. Con means the conicity value of each tire and the ply represents the plysteer value for each tire. Lateral Force Variation data:

| Load | 100% | | 150% | |
|------|------|-----|------|-----|
| Serials | Con | Ply | Con | Ply |
| 143 | −1 | 65 | 3 | 84 |
| 146 | −2 | 66 | 4 | 83 |
| 148 | −3 | 67 | 2 | 85 |
| 149 | −2 | 69 | 8 | 85 |

Although none of the combination of tires, as selected with the prediction program, was actually within the prescribed limits, one set of serials 148-143-149-146 had following resulting. forces on the axles:

| Load | 100% | 150% |
|------|------|------|
| RESF | −1 | 3 |
| RESR | −1 | 7 |

Based on this data, the program gave the following prediction for the three measured factors:

Stability NOK
Load sensitivity OK
Preload NOK

Where NOK means not within preset limits and OK means within preset limits.

The set of tires received a subjective handling rating of 4 which is not considered to be high enough to provide the desired level of performance.

Example 2

Another example of the use of the preselection software program is with one tire construction that yields the following data from the lateral force variation data acquired by testing on a Tire Uniformity Machine at 100% normal load and at 150% normal load:

| Load Constr: | AE5590-02 Serials | 100% | | 150% | |
|---|---|---|---|---|---|
| | | Con | Ply | Con | Ply |
| | 110 | −1 | 65 | 3 | 84 |
| | 113 | −2 | 66 | 4 | 83 |
| | 121 | −3 | 67 | 2 | 85 |
| | 95 | −2 | 69 | 8 | 85 |

Nine combinations out of 24 possibilities, as selected with the prediction program were found to meet the three Rules. One set was selected with following resulting forces on the axles:

Set: 110-121-95-113

| Load | 100% | 150% |
|---|---|---|
| RESF | 9 | 23 |
| RESR | 12 | 25 |

This gave the following prediction:

| Preload | OK |
|---|---|
| Stability | OK |
| Load sensitivity | OK |

The handling of this set of tires was subjectively given a rating of 7.5 which is considered to provide an adequate level of performance.

Example 3

A different permutation of the tires used in the previous example with more residual force on each axle but less difference between RESF and RESR provided no better results.

| Load | 100% | 150% |
|---|---|---|
| RESF | 11 | 24 |
| RESR | 12 | 27 |

The handling of this set of tires was subjectively given a rating of 4.5. This result is not surprising since the front to rear ratio indicated that the selected set was less stable.

Example 4

A fourth example of a construction having only 5 tires generated the following force variation data:

| Load | 100% | | 150% | |
|---|---|---|---|---|
| Serials | Con | Ply | Con | Ply |
| 004 | 15 | 76 | 36 | 87 |
| 006 | 21 | 74 | 46 | 84 |
| 008 | 15 | 74 | 37 | 87 |
| 009 | 13 | 72 | 27 | 84 |
| 010 | 10 | 77 | 27 | 89 |

The last 4 serials selected with the program were found to be OK. This set caused the following resulting forces in pounds on the axles:

Set: 9-10-8-5

| Load | 100% | 150% |
|---|---|---|
| RESF | 9 | 30 |
| RESR | 18 | 43 |

This gave as the following prediction:

| Preload | OK |
|---|---|
| Stability | OK |
| Load sensitivity | OK |

The subjective handling rating given to this set of tires was 8, a relatively high value.

Example 5

To appreciate the influence of the ratio RESF/RESR, the position that the tires were mounted to the car in Example 4 was changed to the following:

Set 5-10-8-9

| Load | 100% | 150% |
|---|---|---|
| RESF | 14 | 34 |
| RESR | 15 | 39 |

This configuration reduced the handling rating to 6.5, and confirms the proposition that providing more preload, and hence stability on the rear axle then on the front axle, is preferred by the test drivers. To see the influence of the ratio of RESF/RESR, the position that the tires were mounted to the wheels was changed in Example 6 below.

Example 6

By changing one tire, the results from a new set of test tires was generated. Set 9-10-5-8

| Load | 100% | 150% |
|---|---|---|
| RESF | 9 | 30 |
| RESR | 16 | 37 |
| Preload | | OK |
| Stability | | OK |
| Load sensitivity | | OK |

The set of tires was given a subjective handling rating by a driver of 7.5 which is expected based on the fact that the set of tires met the three rules and the rear axle had more stability than the front axle.

It is apparent that there has been provided in accordance with this invention a method for selecting a set of experimental tires of one construction based on criteria including plysteer, conicity, load sensitivity, residual forces on each axle and the position each individual tire is mounted to the vehicle. The method includes the step of determining for each permutation of sets of tires whether or not the combination fulfills the Rule of Axle Stability, the Rule of Load Sensitivity, and the Rule of Axle Preload. Then, one or more tire sets which preferably meet all of the three rules is tested to see if the prediction holds. The advantage of this method is the ability to select a matched set of tires from a larger group of experimentally built tires so that the performance of the selected set can predict the handling characteristics of the set and to more closely match the performance of a comparable set of production tires.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

We claim:

1. A method for selecting a representative set of tires from a group of experimental tires having a single tire construction, said representative set of tires comprising a grouping of a front pair of tires for mounting on a front axle of a vehicle with a rear pair of tires for mounting on a rear axle of said vehicle, said method comprising the steps of:

a) calculating a residual force on said front axle (RESF) at a first tire deflection and a residual force on said rear axle (RESR) at said first tire deflection for a plurality of front pairs and rear pairs of tires from said group of experimental tires, and selecting first groupings of front pairs with rear pairs such that said RESR at said first tire deflection is equal to or a predetermined amount greater than said RESF at said first tire deflection;

b) calculating an RESF for a plurality of front pairs at a second tire deflection that is greater than said first tire deflection, and calculating an RESR for a plurality of rear pairs at said second tire deflection, and selecting second groupings of front pairs with rear pairs such that the absolute value of said RESR at said second tire deflection is equal to or a predetermined amount greater than the absolute value of said RESF at said second tire deflection, and the absolute value of said RESF at said second tire deflection is equal to or greater than the absolute value of said RESF at said first tire deflection;

c) selecting third groupings of front pairs with rear pairs such that said RESF at said first tire deflection and said RESR at said first tire deflection are each either greater than a predetermined maximum value or less than a predetermined minimum value; and d) selecting said representative set of tires such that said representative set of tires is a grouping of front pairs with rear pairs that is simultaneously one of said first groupings, one of said second groupings, and one of said third groupings.

2. The method of claim 1 including the steps of determining, for each of a plurality of tires from said group of experimental tires:

the average lateral force (LF1) in the clockwise (CW) direction and the average lateral force (LF2) in the counterclockwise (CCW) direction, for both said first tire deflection and said second tire deflection.

3. The method of claim 2 further including the steps of:

measuring conicity and plysteer of each of said plurality of tires in the CW and CCW directions at said first tire deflection corresponding to a first load of about 80% to about 120% of a normal load on a tire uniformity machine, wherein said normal load is a loading force that is normally applied to a tire while mounted on said vehicle;

measuring the conicity and plysteer of each of said plurality of tires in the CW and CCW directions at said second tire deflection corresponding to a second load of about 130% to about 170% of said first load on said tire uniformity machine;

calculating said conicity and plysteer for said first and second loads from the equations:

$$\text{conicity}=(LF1-LF2)/2,$$

$$\text{plysteer}=(LF1+LF2)/2; \text{ and}$$

calculating a residual force on an axle having a pair of tires denoted by index letters "l" for left and "r" for right, using conicity values Cl and Cr for left tire and right tire, respectively, and using plysteer values Pl and Pr for left tire and right tire, respectively, according to the equation:

$$\text{residual force on an axle}=(Cl+Cr+(Pl-Pr))/2.$$

4. The method of claim 3 further including the steps of:

measuring the conicity and plysteer at said first load corresponding to about 90% to about 110% of said normal load, and measuring the conicity and plysteer at said second load corresponding to about 140% to about 160% of said normal load.

5. The method of claim 4 further including the steps of:

measuring the conicity and plysteer at said first load corresponding to about 100% of said normal load, and measuring the conicity and plysteer at said second load corresponding to about 150% of said normal load.

6. The method of claim 1 wherein selecting first groupings of pairs of tires in step a) is such that said RESR at said first tire deflection is between about 0 to about 4 pounds greater than said RESF at said first tire deflection.

7. The method of claim 1 wherein selecting second groupings of pairs of tires in step b) is such that said RESF and said RESR at said second tire deflection are within a predetermined range of values of about −4.0 to 4.0 pounds.

8. The method of claim 1 wherein selecting third groupings of pairs of tires in step c) is such that said RESF at said first tire deflection and said RESR at said first tire deflection are greater than about 3.0 lbs or less than about −3.0 lbs.

9. The method of claim 1 wherein selecting first groupings of pairs of tires in step a) is such that said RESR at said first tire deflection is greater than a predetermined amount above said RESF at said first tire deflection.

10. The method of claim 1 wherein selecting first groupings of pairs of tires in step a) is such that said RESR at said first tire deflection is between about 0 and about 2 pounds greater than said RESF at said first tire deflection.

* * * * *